United States Patent
Iwase

(10) Patent No.: US 10,581,048 B2
(45) Date of Patent: Mar. 3, 2020

(54) NON-AQUEOUS ELECTROLYTE BATTERY HAVING FIRST SEPARATOR LAYER WITH TOTAL PORE VOLUME LARGER THAN SECOND SEPARATOR LAYER

(71) Applicant: TOYOTA JIDOSHA KABUSHIKI KAISHA, Toyota-shi, Aichi-ken (JP)

(72) Inventor: Kosuke Iwase, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 244 days.

(21) Appl. No.: 15/071,240

(22) Filed: Mar. 16, 2016

(65) Prior Publication Data

US 2016/0276643 A1    Sep. 22, 2016

(30) Foreign Application Priority Data

Mar. 18, 2015    (JP) ................ 2015-054626

(51) Int. Cl.
*H01M 2/16*    (2006.01)
*H01M 2/18*    (2006.01)
(Continued)

(52) U.S. Cl.
CPC ........... *H01M 2/1686* (2013.01); *H01M 2/18* (2013.01); *H01M 10/052* (2013.01);
(Continued)

(58) Field of Classification Search
CPC .... H01M 2/1686; H01M 2/18; H01M 10/052; H01M 10/0558; H01M 10/4235
(Continued)

(56) References Cited

U.S. PATENT DOCUMENTS

| 4,650,730 A | * | 3/1987 | Lundquist | ........... | H01M 2/1653 |
| | | | | | 429/62 |
| 2003/0118896 A1 | * | 6/2003 | Yamaguchi | ......... | H01M 2/1653 |
| | | | | | 429/145 |

(Continued)

FOREIGN PATENT DOCUMENTS

| JP | 10074502 A | * | 3/1998 |
| JP | 2002-319386 A | | 10/2002 |

(Continued)

OTHER PUBLICATIONS

Sumihara, Masanori, Machine Translation of JP 2010-061819 A, Mar. 2010 (Year: 2010).*

(Continued)

*Primary Examiner* — Sean P Cullen
(74) *Attorney, Agent, or Firm* — Sughrue Mion, PLLC

(57) ABSTRACT

A non-aqueous electrolyte secondary battery includes a positive electrode, a negative electrode, a first separator layer provided between the positive electrode and the negative electrode, the first separator layer facing the positive electrode, a second separator layer provided between the positive electrode and the negative electrode, the second separator layer facing the negative electrode, and a non-aqueous electrolyte held in the first separator layer and the second separator layer. The variable α represents the porosity of the first separator layer, and the variable β represents the porosity of the second separator layer, such that $\alpha \le 90\%$ and the following expression is satisfied:

$2 \le \alpha/\beta \le 2.85$.

4 Claims, 2 Drawing Sheets

(51) Int. Cl.
H01M 10/058 (2010.01)
H01M 10/42 (2006.01)
H01M 10/052 (2010.01)

(52) U.S. Cl.
CPC ..... H01M 10/058 (2013.01); H01M 10/4235 (2013.01); H01M 2200/10 (2013.01); Y02T 10/7011 (2013.01)

(58) Field of Classification Search
USPC .......................................................... 429/145
See application file for complete search history.

(56) References Cited

U.S. PATENT DOCUMENTS

| | | | | |
|---|---|---|---|---|
| 2006/0141351 | A1* | 6/2006 | Suh | H01M 2/145 |
| | | | | 429/144 |
| 2009/0233176 | A1 | 9/2009 | Kita et al. | |
| 2012/0301698 | A1* | 11/2012 | Rhee | B32B 7/02 |
| | | | | 428/220 |
| 2015/0010798 | A1* | 1/2015 | Sawai | H01M 2/1626 |
| | | | | 429/94 |
| 2015/0140389 | A1 | 5/2015 | Nagai et al. | |
| 2015/0255770 | A1* | 9/2015 | Iwase | H01M 2/1686 |
| | | | | 429/94 |
| 2016/0359158 | A1* | 12/2016 | Janakiraman | H01M 2/1653 |

FOREIGN PATENT DOCUMENTS

| | | | | |
|---|---|---|---|---|
| JP | 2004-6164 A | | 1/2004 | |
| JP | 2004-172109 A | | 6/2004 | |
| JP | 2007-18861 A | | 1/2007 | |
| JP | 2007018861 A | * | 1/2007 | |
| JP | 2007-234458 A | | 9/2007 | |
| JP | 2010061819 A | * | 3/2010 | |
| JP | 2010245028 A | * | 10/2010 | |
| JP | 2011-233354 A | | 11/2011 | |
| JP | 2013-54973 A | | 3/2013 | |
| JP | 2014-11067 A | | 1/2014 | |
| JP | 2015-26490 A | | 2/2015 | |
| WO | 2007072759 A1 | | 6/2007 | |
| WO | WO-2012120579 A1 | * | 9/2012 | .............. H01M 2/16 |

OTHER PUBLICATIONS

Sakakibara, Yuzuru, Machine Translation of JP 2010-245028 A, Oct. 2010 (Year: 2010).*
Hina Yasuhiko, Machine Translation of WO 2012/120579 A1, Sep. 2012 (Year: 2012).*
Wikipedia contributors. "Polymer." Wikipedia, The Free Encyclopedia. Wikipedia, The Free Encyclopedia, Jul. 16, 2019. Web. Jul. 30, 2019. (Year: 2019).*
Nagayama, Shin, Machine Translation of JP 2007-018861 A, Jan. 2007 (Year: 2007).*

* cited by examiner

AXIAL DIRECTION OF ELECTRODE ASSEMBLY
WIDTH DIRECTION OF POSITIVE ELECTRODE
WIDTH DIRECTION OF NEGATIVE ELECTRODE

NON-AQUEOUS ELECTROLYTE BATTERY HAVING FIRST SEPARATOR LAYER WITH TOTAL PORE VOLUME LARGER THAN SECOND SEPARATOR LAYER

INCORPORATION BY REFERENCE

The disclosure of Japanese Patent Application No. 2015-054626 filed on Mar. 18, 2015 including the specification, drawings and abstract is incorporated herein by reference in its entirety.

BACKGROUND OF THE INVENTION

1. Field of the Invention

The invention relates to a non-aqueous electrolyte secondary battery including a positive electrode, a negative electrode, a separator provided between the positive electrode and the negative electrode, and a non-aqueous electrolyte held at least in the separator.

2. Description of Related Art

Japanese Patent Application Publication No. 2002-319386 (JP 2002-319386 A) describes providing a non-aqueous electrolyte secondary battery with a separator obtained by stacking a plurality of layers each made of a porous material having microscopic pores. In the separator described in JP 2002-319386 A, at least two of the layers each made of a porous material are different in porosity from each other. Among the layers that are different in porosity from each other, the layer having the highest porosity is greater in mean pore size of the microscopic pores than the layer having the lowest porosity. According to JP 2002-319386 A, using such a separator makes it possible to achieve compatibility between good low-temperature characteristics and high overcharge safety in the non-aqueous electrolyte secondary battery.

In a non-aqueous electrolyte secondary battery, a separator is provided between a positive electrode and a negative electrode, and a non-aqueous electrolyte is present inside a plurality of pores of the separator. This configuration ensures the migration of ions (ions contained in the non-aqueous electrolyte (e.g. lithium ions)) between the positive electrode and the negative electrode or the flow of electric current between the positive electrode and the negative electrode.

When the temperature of a non-aqueous secondary battery reaches or exceeds the melting point of a material of a separator of the non-aqueous secondary battery, the material of the separator melts. As a result, pores of the separator are blocked, so that the migration of ions is interrupted or the flow of electric current is interrupted (the separator is shut down). A shutdown of the separator increases the resistance between a positive electrode and a negative electrode, thereby preventing a large current from flowing between the positive electrode and the negative electrode. Thus, the operation of the non-aqueous electrolyte secondary battery is safely stopped.

SUMMARY OF THE INVENTION

The temperature of a non-aqueous electrolyte secondary battery may further increase after a shutdown of a separator. When the temperature of the non-aqueous electrolyte secondary battery significantly increases after the shutdown of the separator, for example, thermal shrinkage of the separator may occur. Note that, "thermal shrinkage of a separator" means shrinkage or disappearance of a separator due to an increase in the temperature of the separator. Thus, it is preferable to prevent a significant increase in the temperature of the non-aqueous electrolyte secondary battery after the shutdown of the separator. In view of this, a non-aqueous electrolyte secondary battery with a higher level of safety has been demanded. The invention provides a non-aqueous electrolyte secondary battery with a higher level of safety.

The reason why the temperature of a non-aqueous electrolyte secondary battery further increases after a shutdown of a separator is considered as follows.

After a shutdown of a separator, the temperature of a non-aqueous electrolyte secondary battery tends to decrease. However, immediately after the shutdown of the separator, the temperature of the non-aqueous secondary battery is not sufficiently decreased in some cases. When the temperature of the non-aqueous electrolyte secondary battery is high, a reaction (exothermic reaction) between a positive-electrode active material or negative-electrode active material and a non-aqueous electrolyte is considered to occur readily.

When the separator is not shut down, the non-aqueous electrolyte is present inside a plurality of pores of the separator. Because the separator is provided between a positive electrode and a negative electrode, the non-aqueous electrolyte is present in the vicinity of a site where the exothermic reaction may occur. The non-aqueous electrolyte has a large heat capacity. Thus, when the separator is not shut down, even if the exothermic reaction occurs, the heat generated by the exothermic reaction can be transferred to the non-aqueous electrolyte.

On the other hand, when the separator is shut down, the pores of the separator are blocked, and the non-aqueous electrolyte, which has been present inside the pores, is discharged to the outside of the separator. Thus, the amount of non-aqueous electrolyte present near the site where the exothermic reaction may occur is reduced. Thus, when the exothermic reaction occurs while the separator is shut down, it is difficult to transfer the heat generated by the exothermic reaction to the non-aqueous electrolyte. This causes a further increase in the temperature of the non-aqueous electrolyte secondary battery. That is, the temperature of the non-aqueous electrolyte secondary battery further increases after the shutdown of the separator.

In the exothermic reaction, the amount of heat generated by a reaction between the positive-electrode active material and the non-aqueous electrolyte is considered to be greater than the amount of heat generated by a reaction between the negative-electrode active material and the non-aqueous electrolyte. In view of the above-described circumstances, a non-aqueous electrolyte secondary battery of the invention is provided.

An aspect of the invention relates to a non-aqueous electrolyte secondary battery including a positive electrode, a negative electrode, a separator provided between the positive electrode and the negative electrode, and a non-aqueous electrolyte held in the separator. The separator includes a first separator layer facing the positive electrode and a second separator layer facing the negative electrode. Where $\alpha$ represents the total volume of pores of the first separator layer, and $\beta$ represents the total volume of pores of the second separator layer, Expression 1 and Expression 2 are satisfied:

$$2 \leq \alpha/\beta \leq 2.85 \qquad (1); \text{ and}$$

$$\alpha \leq 12 \text{ cm}^3 \qquad (2).$$

In the non-aqueous electrolyte secondary battery according to the above aspect, the condition of $2 \leq \alpha/\beta$ is satisfied. Thus, a shutdown of the first separator layer requires a larger amount of thermal energy than the amount of thermal energy required for a shutdown of the second separator layer. Therefore, even after the second separator layer is shut down, at least some of the pores of the first separator layer remain without being blocked, and the non-aqueous electrolyte is present inside the remaining pores.

The first separator layer faces the positive electrode. Thus, even when a reaction between the positive-electrode active material and the non-aqueous electrolyte occurs after a shutdown of the second separator layer, the heat generated by the reaction is transferred to the non-aqueous electrolyte (the non-aqueous electrolyte present inside the pores remaining without being blocked in the first separator layer). This makes it possible to prevent the temperature of the non-aqueous electrolyte secondary battery from further increasing after the shutdown of the second separator layer.

In the non-aqueous electrolyte secondary battery according to the above aspect, the condition of $\alpha/\beta \leq 2.85$ is satisfied and Expression 2 is satisfied. Thus, the strength of the first separator layer is maintained at a high level. This configuration prevents the first separator layer from being crushed during production of the non-aqueous electrolyte secondary battery or during normal charging or discharging of the secondary battery. Thus, the performance of the first separator layer during normal charging or discharging of the non-aqueous electrolyte secondary battery is maintained at a high level.

In this specification, "non-aqueous electrolyte held in the separator" means the state where at least a portion of the non-aqueous electrolyte is present inside the pores of the separator.

Further, "total volume of the pores of the first separator layer" means a value determined by measurement of the pore volume by a mercury porosimeter. Similarly, "total volume of the pores of the second separator layer" means a value determined by the same method as that for measuring the total volume of the pores of the first separator layer, that is, a value determined by measurement of the pore volume by a mercury porosimeter.

The first separator layer and the second separator layer may have the same thickness. With this configuration, the thermal shrinkage of the first separator layer and the thermal shrinkage of the second separator layer are equal to each other. This makes it possible to readily achieve the state where at least some of the pores of the first separator layer remain without being blocked even after a shutdown of the second separator layer.

In this specification, "the first separator layer and the second separator layer have the same thickness" means the state where the ratio of the thickness of the first separator layer to the thickness of the second separator layer is within a range from 0.95 to 1.05. The thickness of the first separator layer means a length of the first separator layer in a direction from the positive electrode toward the negative electrode, and is a value measured by a thickness meter. Similarly, the thickness of the second separator layer means a length of the second separator layer in a direction from the positive electrode toward the negative electrode, and is a value measured by the same method of measuring a thickness of the first separator layer.

The positive electrode may contain a positive-electrode active material having a specific surface area of 2.5 $m^2/g$ or less. Thus, the area of contact between the positive-electrode active material and the non-aqueous electrolyte can be made small, so that the amount of heat generated by a reaction between the positive-electrode active material and the non-aqueous electrolyte can be made small.

In this specification, "the positive electrode contains a positive-electrode active material having a specific surface area of 2.5 $m^2/g$ or less" means the state where the specific surface area of at least a portion of the positive-electrode active material contained in the positive electrode has a specific surface area of 2.5 $m^2/g$ or less. Thus, "the positive electrode contains a positive-electrode active material having a specific surface area of 2.5 $m^2/g$ or less" includes not only the state where the specific surface area of all the positive-electrode active material contained in the positive electrode is 2.5 $m^2/g$ or less, but also the state where a positive-electrode active material having a specific surface area exceeding 2.5 $m^2/g$ and a positive-electrode active material having a specific surface area of 2.5 $m^2/g$ or less are contained in the positive electrode. Further, "specific surface area" means a BET specific surface area, and is determined by, for example, measurement of the amount of adsorbed nitrogen.

According to the above aspect of the invention, the performance of the first separator layer during normal charging or discharging is maintained at a high level, and a further increase in the temperature of the non-aqueous electrolyte secondary battery after a shutdown of the second separator layer is prevented. As a result, the safety of the non-aqueous electrolyte secondary battery is further enhanced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
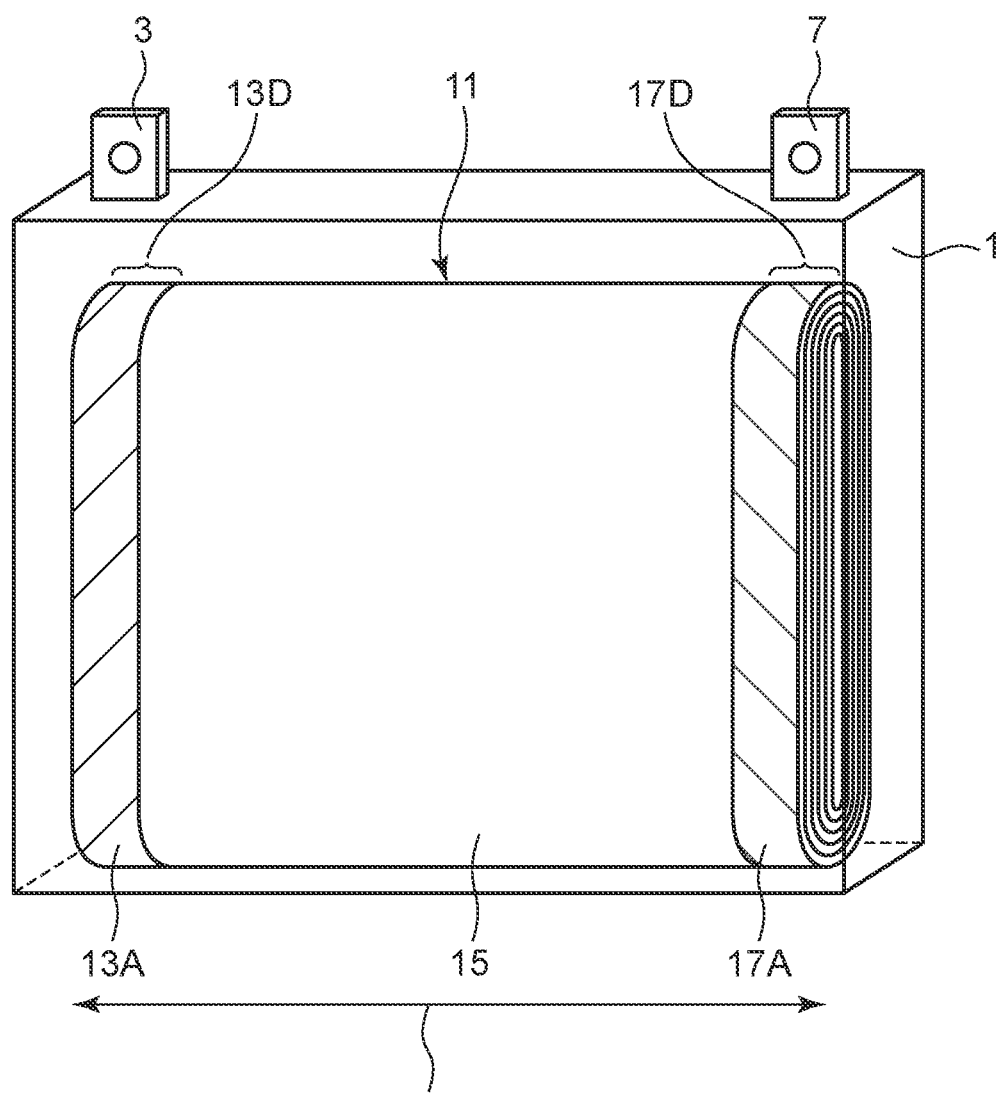
FIG. 1 is a perspective view of a non-aqueous electrolyte secondary battery according to an embodiment of the invention.

Hereinafter, the invention will be described with reference to the accompanying drawings. In the drawings, the same or equivalent elements are denoted by the same reference symbols. The dimensional relationships, such as length, width, thickness, and depth, are changed as appropriate for the sake of clarity and simplicity of the drawings, and do not indicate the actual dimensional relationships.

Configuration of Non-Aqueous Electrolyte Secondary Battery

FIG. 1 is a perspective view of a non-aqueous electrolyte secondary battery according to an embodiment of the invention. In the non-aqueous electrolyte secondary battery of the present embodiment, an electrode assembly 11 and a non-aqueous electrolyte (not illustrated) are provided inside a battery case 1. FIG. 1 illustrates a part of the internal structure of the non-aqueous electrolyte secondary battery of the present embodiment. The battery case 1 is provided with a positive-electrode terminal 3 and a negative-electrode terminal 7.

Electrode Assembly

Figure 2:
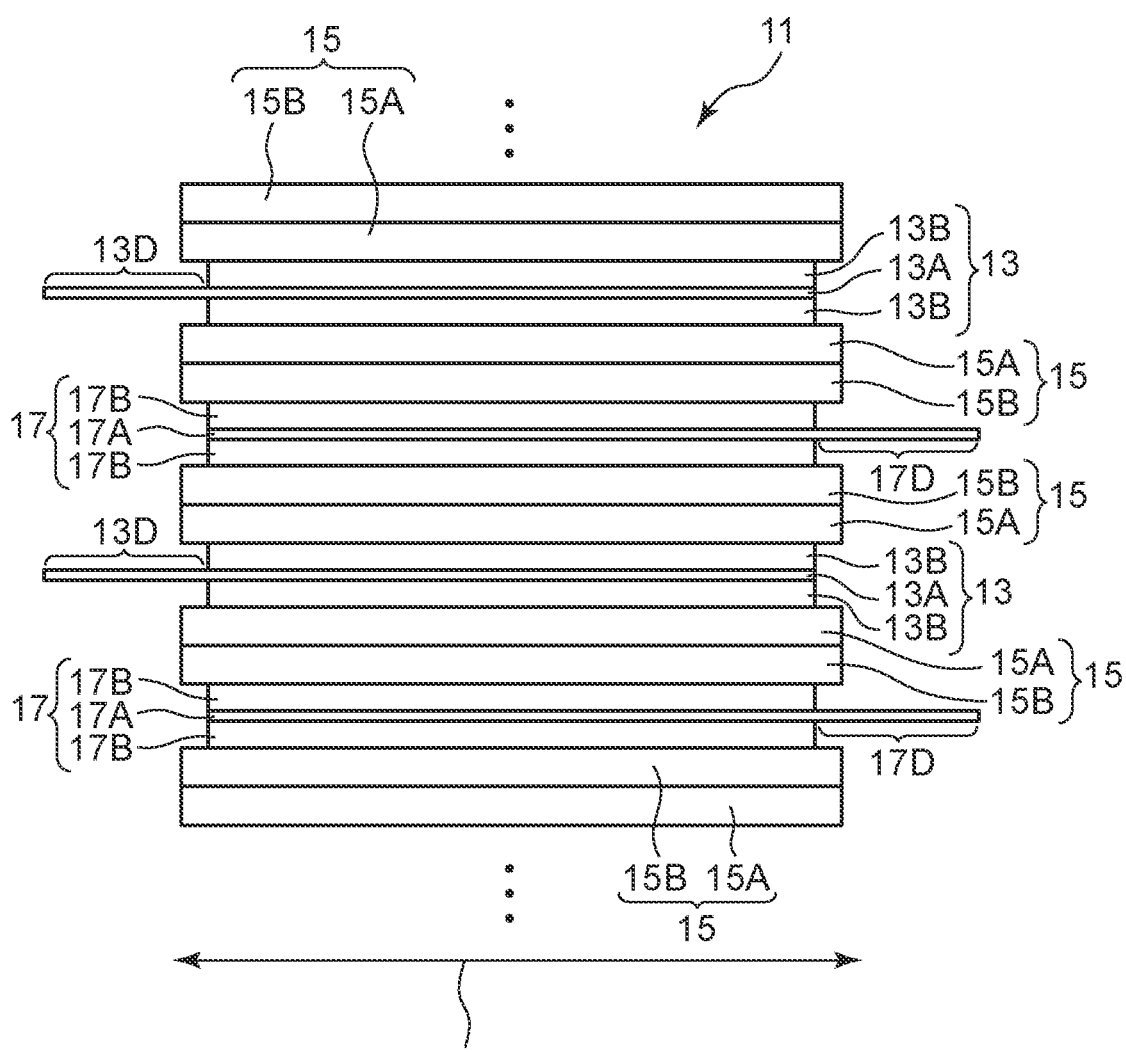
FIG. 2 is a sectional view of an electrode assembly according to the embodiment of the invention.

FIG. 2 is a sectional view of the electrode assembly 11 of the present embodiment. The electrode assembly 11 includes a positive electrode 13, a negative electrode 17, and a separator 15 provided between the positive electrode 13 and the negative electrode 17. In the electrode assembly 11, the positive electrode 13 and the negative electrode 17 are rolled with the separator 15 interposed therebetween.

The positive electrode 13 includes a positive-electrode current collector 13A, positive-electrode mixture layers 13B, and a positive-electrode exposed portion 13D. The positive-electrode mixture layers 13B are provided on respective surfaces of the positive-electrode current collector 13A, except one end portion (left end portion in FIG. 2) in the width direction of the positive electrode 13. The positive-electrode exposed portion 13D is at one end of the positive electrode 13 in its width direction, and the positive-electrode exposed portion 13D is a portion at which the positive-electrode mixture layers 13B are not provided on the positive-electrode current collector 13A. Note that, "width direction of the positive electrode 13" means a direction that is perpendicular to the longitudinal direction of the positive electrode 13 which has not been formed into the electrode assembly 11, and that is parallel to the surfaces of the positive-electrode current collector 13A on which the positive-electrode mixture layers 13B are provided.

The negative electrode 17 includes a negative-electrode current collector 17A, negative-electrode mixture layers 17B, and a negative-electrode exposed portion 17D. The negative-electrode mixture layers 17B are provided on respective surfaces of the negative-electrode current collector 17A, except one end portion (right end portion in FIG. 2) in the width direction of the negative electrode 17. The negative-electrode exposed portion 17D is at one end of the negative electrode 17 in its width direction, and the negative-electrode exposed portion 17D is a portion at which the negative-electrode mixture layers 17B are not provided on the negative-electrode current collector 17A. Note that, "width direction of the negative electrode 17" means a direction that is perpendicular to the longitudinal direction of the negative electrode 17 which has not been formed into the electrode assembly 11, and that is parallel to the surfaces of the negative-electrode current collector 17A on which the negative-electrode mixture layers 17B are provided.

The positive-electrode exposed portion 13D and the negative-electrode exposed portion 17D stick out from the separator 15 so as to extend in opposite directions along the axial direction of the electrode assembly 11. The positive-electrode exposed portion 13D is connected to the positive-electrode terminal 3, and the negative-electrode exposed portion 17D is connected to the negative-electrode terminal 7. Note that, "axial direction of the electrode assembly 11" means a direction parallel to the width direction of the positive electrode 13 and the width direction of the negative electrode 17.

Each positive-electrode mixture layer 13B contains a positive-electrode active material, a conductive agent, and a binder. Each positive-electrode mixture layer 13B has a plurality of pores. Each negative-electrode mixture layer 17B contains a negative-electrode active material and a binder. Each negative-electrode mixture layer 17B has a plurality of pores. The separator 15 is provided between the positive-electrode mixture layer 13B and the negative-electrode mixture layer 17B. The separator 15 has a plurality of pores. The non-aqueous electrolyte is present in the pores of the positive-electrode mixture layers 13B, the pores of the negative-electrode mixture layers 17B, and the pores of the separator 15. A part of the non-aqueous electrolyte may be present inside the battery case 1 without being held in any of the positive-electrode mixture layers 13B, the negative-electrode mixture layers 17B, and the separator 15.

Separator

The separator 15 includes a first separator layer 15A facing the positive electrode 13 and a second separator layer 15B facing the negative electrode 17. Where $\alpha$ represents the total volume (cm$^3$) of the pores of the first separator layer 15A, and $\beta$ represents the total volume (cm$^3$) of pores of the second separator layer 15B, Expression 1 and Expression 2 are satisfied.

$$2 \le \alpha/\beta \le 2.85 \tag{1}$$

$$\alpha \le 12 \text{ cm}^3 \tag{2}$$

When the temperature of the non-aqueous electrolyte secondary battery of the present embodiment reaches or exceeds the melting point of the material of the first separator layer 15A, the material of the first separator layer 15A melts and thus the pores of the first separator layer 15A are blocked. Similarly, when the temperature of the non-aqueous electrolyte secondary battery of the present embodiment reaches or exceeds the melting point of the material of the second separator layer 15B, the material of the second separator layer 15B melts and thus the pores of the second separator layer 15B are blocked.

In the present embodiment, the condition of $2 \le \alpha/\beta$ is satisfied. Thus, blocking of the pores of the first separator layer 15A is considered to require a larger amount of thermal energy than the amount of thermal energy required for blocking of the pores of the second separator layer 15B. Therefore, even after the pores of the second separator layer 15B are blocked due to an increase in the temperature of the non-aqueous electrolyte secondary battery, at least some of the pores of the first separator layer 15A remain without being blocked.

When the pores of the second separator layer 15B are blocked, the migration of ions (ions contained in the non-aqueous electrolyte (e.g. lithium ions)) or the flow of electric current is interrupted in the second separator layer 15B (i.e., the second separator layer 15B is shut down). When the pores of the second separator layer 15B are blocked, even if at least some of the pores of the first separator layer 15A remain without being blocked, the resistance between the positive electrode 13 and the negative electrode 17 increases. This makes it possible to prevent a large current from flowing between the positive electrode 13 and the negative electrode 17. Thus, the operation of the non-aqueous electrolyte secondary battery of the present embodiment is safely stopped.

Due to a shutdown of the second separator layer 15B, the temperature of the non-aqueous electrolyte secondary battery tends to decrease. However, immediately after the shutdown of the second separator layer 15B, the temperature of the non-aqueous secondary battery is maintained high in some cases. Thus, a reaction (exothermic reaction) between the positive-electrode active material or negative-electrode active material and the non-aqueous electrolyte may occur. As described above, the amount of heat generated by the reaction between the positive-electrode active material and the non-aqueous electrolyte is greater than the amount of heat generated by the reaction between the negative-electrode active material and the non-aqueous electrolyte. Thus, when a reaction between the positive-electrode active material and the non-aqueous electrolyte occurs, the temperature of the non-aqueous electrolyte secondary battery significantly increases after a shutdown of the second separator layer 15B.

However, in the non-aqueous electrolyte secondary battery of the present embodiment, the condition of $2 \le \alpha/\beta$ is satisfied. Therefore, even after the pores of the second separator layer 15B are blocked, at least some of the pores of the first separator layer 15A remain without being blocked. Thus, even after a shutdown of the second separator layer 15B, the non-aqueous electrolyte is still held in the first separator layer 15A.

The first separator layer 15A faces the positive electrode 13. Thus, as long as the non-aqueous electrolyte is still held in the first separator layer 15A even after a shutdown of the second separator layer 15B, the non-aqueous electrolyte (the non-aqueous electrolyte has a large heat capacity) is present in the vicinity of a site where a reaction between the positive-electrode active material and the non-aqueous electrolyte may occur, even after the shutdown of the second separator layer 15B. Thus, even when a reaction between the positive-electrode active material and the non-aqueous electrolyte occurs after a shutdown of the second separator layer 15B, the heat generated by the reaction is transferred to the non-aqueous electrolyte held in the first separator layer 15A. This makes it possible to prevent the temperature of the non-aqueous electrolyte secondary battery from further increasing. As a result, for example, thermal shrinkage of the separator 15 is effectively prevented.

The foregoing description will be summarized as follows: the operation of the non-aqueous electrolyte secondary battery of the present embodiment is safely stopped through a shutdown of the second separator layer 15B. Even when a reaction between the positive-electrode active material and the non-aqueous electrolyte occurs after a shutdown of the second separator layer 15B, the temperature of the non-aqueous electrolyte secondary battery is prevented from further increasing. Thus, the safety of the non-aqueous electrolyte secondary battery is further enhanced.

In the non-aqueous electrolyte secondary battery of the present embodiment, the condition of $\alpha/\beta \leq 2.85$ is satisfied and Expression 2 is satisfied. Thus, the strength of the first separator layer 15A is maintained at a high level. This configuration prevents the first separator layer 15A from being crushed during production of the non-aqueous electrolyte secondary battery or during normal charging or discharging of the secondary battery. Thus, the performance of the first separator layer 15A during normal charging or discharging of the non-aqueous electrolyte secondary battery is maintained at a high level. This also makes it possible to further enhance the safety of the secondary battery.

As described above, the present embodiment makes it possible to further enhance the safety of the non-aqueous electrolyte secondary battery. When the non-aqueous electrolyte secondary battery of the present embodiment is used as a large battery used in, for example, power supplies for vehicles (e.g., hybrid vehicles and electric vehicles), power supplies for factories, or power supplies for household use, the safety of such a large battery is further enhanced.

The value $\alpha$ of the pores of the first separator layer 15A can be adjusted by adjusting at least one of the thickness of the first separator layer 15A and the porosity of the first separator layer 15A. For example, when the thickness of the first separator layer 15A or the porosity of the first separator layer 15A is increased, the total volume $\alpha$ of the pores of the first separator layer 15A is increased. When the size of each of the pores of the first separator layer 15A or the number of the pores of the first separator layer 15A is increased, the porosity of the first separator layer 15A is increased, resulting in an increase in the total volume $\alpha$ of the pores of the first separator layer 15A.

Similarly, the total volume $\beta$ of the pores of the second separator layer 15B can be adjusted by adjusting at least one of the thickness of the second separator layer 15B and the porosity of the second separator layer 15B. For example, when the thickness of the second separator layer 15B or the porosity of the second separator layer 15B is reduced, the total volume $\beta$ of the pores of the second separator layer 15B is reduced. When the size of each of the pores of the second separator layer 15B or the number of the pores of the second separator layer 15B is reduced, the porosity of the second separator layer 15B is reduced, resulting in a reduction in the total volume $\beta$ of the pores of the second separator layer 15B. Preferably, the thickness and porosity of the first separator layer 15A and the thickness and porosity of the second separator layer 15B are set such that Expression 1 and Expression 2 are satisfied.

For example, when the thickness of the first separator layer 15A and the thickness of the second separator layer 15B are equal to each other and the second separator layer 15B has a porosity of 30%, the porosity of the first separator layer 15A is preferably within a range from 60% to 85%. Thus, Expression 1 and Expression 2 are satisfied.

When the thickness of the first separator layer 15A and the thickness of the second separator layer 15B are equal to each other and the second separator layer 15B has a porosity of 40%, the porosity of the first separator layer 15A is preferably within a range from 80% to 85%. Thus, Expression 1 and Expression 2 are satisfied.

Note that, "porosity of the first separator layer 15A" means the ratio of the total volume of the pores of the first separator layer 15A to the volume of the first separator layer 15A that is assumed to have no pores. The porosity of the first separator layer 15A is obtained through measurement of the pore volume, for example, by a mercury porosimeter. Similarly, "porosity of the second separator layer 15B" means the ratio of the total volume of the pores of the second separator layer 15B to the volume of the second separator layer 15B that is assumed to have no pores. The porosity of the second separator layer 15B is obtained through measurement of the pore volume, for example, by a mercury porosimeter.

As the ratio $\alpha/\beta$ becomes higher, a larger number of pores remain without being blocked in the first separator layer 15A in the state where the pores in the second separator layer 15B are blocked. Thus, in such a state, a larger amount of non-aqueous electrolyte is held in the first separator layer 15A. As a result, the heat generated by a reaction between the positive electrode 13 and the non-aqueous electrolyte is more readily transferred to the non-aqueous electrolyte held in the first separator layer 15A. However, as the ratio $\alpha/\beta$ becomes higher, the total volume $\alpha$ of the pores of the first separator layer 15A becomes higher and thus Expression 2 is less likely to be satisfied. In view of these facts, the ratio $\alpha/\beta$ is preferably within a range from 2 to 2.5, and more preferably within a range from 2 to 2.2.

From the viewpoint of enhancing the strength of the first separator layer 15A, the total volume $\alpha$ of the pores of the first separator layer 15A is preferably less than 12 cm$^3$, and more preferably within a range from 5 cm$^3$ to 10 cm$^3$.

Preferably, the thickness of the first separator layer 15A and the thickness of the second separator layer 15B are equal to each other. With this configuration, the thermal shrinkage of the first separator layer 15A and the thermal shrinkage of the second separator layer 15B are equal to each other. This configuration makes it possible to easily achieve the state where at least some of the pores of the first separator layer 15A remain without being blocked although the pores of the second separator layer 15B are blocked. Thus, even when a reaction between the positive-electrode active material and the non-aqueous electrolyte occurs after a shutdown of the second separator layer 15B, a further increase in the temperature of the non-aqueous electrolyte secondary battery is more reliably prevented. As a result, the safety of the non-aqueous electrolyte secondary battery is further enhanced.

Preferably, the first separator layer 15A and the second separator layer 15B are made of the same material. With this configuration, the thermal shrinkage of the first separator layer 15A and the thermal shrinkage of the second separator layer 15B are equal to each other. Thus, even when a reaction between the positive-electrode active material and the non-aqueous electrolyte occurs after a shutdown of the second separator layer 15B, a further increase in the temperature of the non-aqueous electrolyte secondary battery is more reliably prevented. As a result, the safety of the non-aqueous electrolyte secondary battery is further enhanced. More preferably, the thickness of the first separator layer 15A and the thickness of the second separator layer 15B are equal to each other, and the first separator layer 15A and the second separator layer 15B are made of the same material.

When the thickness of the first separator layer 15A and the thickness of the second separator layer 15B are equal to each other, the total volume $\alpha$ of the pores of the first separator layer 15A can be replaced with the porosity of the first separator layer 15A, and the total volume $\beta$ of the pores of the second separator layer 15B can be replaced with the porosity of the second separator layer 15B. That is, in this case, the ratio of the porosity of the first separator layer 15A to the porosity of the second separator layer 15B is preferably within a range from 2 to 2.85, more preferably within a range from 2 to 2.5, and still more preferably within a range from 2 to 2.2.

When the thickness of the first separator layer 15A and the thickness of the second separator layer 15B are equal to each other, the condition that "the first separator layer 15A has a porosity of less than 90%" is preferably satisfied, instead of Expression 2. From the viewpoint of enhancing the strength of the first separator layer 15A, the porosity of the first separator layer 15A is preferably 85% or less, and more preferably within a range from 65% to 85%.

First Separator Layer

The first separator layer 15A is preferably a porous membrane made of polyethylene (PE) or polypropylene (PP). The thickness of the first separator layer 15A is preferably within a range from 3 µm to 20 µm, and the porosity thereof is preferably within a range from 65% to 85%.

Second Separator Layer

The second separator layer 15B is preferably a porous membrane made of PE or PP. The thickness of the second separator layer 15B is preferably within a range from 3 µm to 20 µm, and the porosity thereof is preferably within a range from 5% to 80%.

Positive Electrode

As the positive-electrode current collector 13A, any positive-electrode current collectors known as positive-electrode current collectors for non-aqueous electrolyte secondary batteries may be used. The positive-electrode current collector 13A may be an aluminum or aluminum-alloy foil having a thickness from 5 µm to 50 µm.

The positive-electrode mixture layer 13B preferably contains a positive-electrode active material having a specific surface area of 2.5 $m^2$/g or less. Thus, the area of contact between the positive-electrode active material and the non-aqueous electrolyte is made small. As a result, even when a reaction between the positive-electrode active material and the non-aqueous electrolyte occurs, the amount of heat generated by the reaction is made small. Thus, even when a reaction between the positive-electrode active material and the non-aqueous electrolyte occurs after a shutdown of the second separator layer 15B, a further increase in the temperature of the non-aqueous electrolyte secondary battery is more reliably prevented. As a result, the safety of the non-aqueous electrolyte secondary battery is further enhanced. The specific surface area of the positive-electrode active material is more preferably within a range from 2.0 $m^2$/g to 2.5 $m^2$/g, and still more preferably within a range from 2.3 $m^2$/g to 2.5 $m^2$/g.

In the present embodiment, the material of the positive-electrode active material is not limited to any specific materials, and is preferably any known positive-electrode active materials for non-aqueous electrolyte secondary batteries. The positive-electrode active material may be, for example, a lithium composite oxide containing at least one of nickel, cobalt, and manganese, a lithium composite oxide having an olivine crystal structure (e.g., $LiFePO_4$), or a mixture of two or more kinds of lithium composite oxides.

The positive-electrode mixture layer 13B contains preferably 80% to 95% of the positive-electrode active material by mass, more preferably 85% to 95% of the positive-electrode active material by mass, and still more preferably 90% to 95% of the positive-electrode active material by mass. The positive-electrode mixture layer 13B contains preferably 1% to 10% of the conductive agent by mass, and more preferably 3% to 10% of the conductive agent by mass. The positive-electrode mixture layer 13B contains preferably 2% to 5% of the binder in mass. The conductive agent is preferably made of a carbon material, such as acetylene black. The binder is preferably made of, for example, PolyVinylidene DiFluoride (PVDF).

Negative Electrode

The material of the negative-electrode current collector 17A is not limited to any specific materials, and may be any known negative-electrode current collectors for non-aqueous electrolyte secondary batteries. For example, the negative-electrode current collector 17A may be a copper foil having a thickness of 5 µm to 50 µm.

The negative-electrode mixture layer 17B contains 80% to 99% of the negative-electrode active material by mass, and 0.3% to 20% of the binder by mass. The negative-electrode active material may be graphite or an alloy material, such as a silicon alloy. The binder is preferably made of, for example, styrene-butadiene rubber (SBR).

Non-Aqueous Electrolyte

The non-aqueous electrolyte is not limited to any specific electrolytes, and may be any known non-aqueous electrolytes for non-aqueous electrolyte secondary batteries. The non-aqueous electrolyte preferably contains, for example, one or more kinds of organic solvents and one or more kinds of lithium salts (e.g., $LiPF_6$). More preferably, the non-aqueous electrolyte further contains an overcharge inhibitor (e.g., cyclohexylbenzene or biphenyl). The organic solvent may be a gel solvent.

Production of Non-Aqueous Electrolyte Secondary Battery

The non-aqueous electrolyte secondary battery of the present embodiment can be produced by a method described below.

First, the positive electrode 13 and the negative electrode 17 are prepared. For example, the positive-electrode mixture layers 13B are formed on the respective surfaces of the positive-electrode current collector 13A, except one end portion (a portion to be turned into the positive-electrode exposed portion 13D) in the width direction of the positive-electrode current collector 13A. The positive-electrode mixture layers 13B may be formed by applying a positive-electrode mixture paste containing a positive-electrode active material, a conductive agent, and a binder, to the positive-electrode current collector 13A. Alternatively, the positive-electrode mixture layers 13B may be formed by bonding wet granulated particles containing a positive-electrode active material, a conductive agent, and a binder, onto the positive-electrode current collector 13A under pressure.

Meanwhile, negative-electrode mixture layers 17B are formed on the respective surfaces of the negative-electrode current collector 17A, except one end portion (a portion to be turned into the negative-electrode exposed portion 17D) in the width direction of the negative-electrode current collector 17A. The negative-electrode mixture layers 17B may be formed by applying a negative-electrode mixture paste containing a negative-electrode active material and a binder, to the negative-electrode current collector 17A. Alternatively, the negative-electrode mixture layers 17B may be formed by bonding wet granulated particles containing a negative-electrode active material and a binder, onto the negative-electrode current collector 17A under pressure.

Next, the electrode assembly 11 is manufactured. The separator 15 that satisfies Expression 1 and Expression 2 is prepared, and the separator 15 is interposed between the positive electrode 13 and the negative electrode 17. At this time, the first separator layer 15A is disposed so as to face the positive-electrode mixture layer 13B of the positive electrode 13 and the second separator layer 15B is disposed so as to face the negative-electrode mixture layer 17B of the negative electrode 17. Further, the positive electrode 13, the negative electrode 17, and the separator 15 are disposed such that the positive-electrode exposed portion 13D and the negative-electrode exposed portion 17D stick out from the separator 15 in opposite directions. A rolled shaft is then provided in parallel to the width direction of the positive electrode 13 and the width direction of the negative electrode 17. The positive electrode 13, the separator 15, and the negative electrode 17 are rolled around the rolled shaft. Then, pressures are applied to the obtained cylindrical electrode assembly in opposite directions, to obtain the electrode assembly 11.

Subsequently, a lid of the battery case 1, the lid being provided with the positive-electrode terminal 3 and the negative-electrode terminal 7, is prepared, and the positive-electrode exposed portion 13D and the negative-electrode exposed portion 17D are connected to the positive-electrode terminal 3 and the negative-electrode terminal 7, respectively. The electrode assembly 11 to which the lid has been connected is accommodated inside the body of the battery case 1, and then the opening of the body of the battery case 1 is closed with the lid. The non-aqueous electrolyte is then injected into the body of the battery case 1 through a liquid injection hole provided in advance in the lid or the body of the battery case 1, and then the liquid injection hole is closed. In this way, the non-aqueous electrolyte secondary battery of the present embodiment is produced.

In the present embodiment, the separator 15 may further include one or more separator layers between the first separator layer 15A and the second separator layer 15B. In this case as well, the above-described advantageous effects can be produced.

The non-aqueous electrolyte secondary battery is not limited to a rectangular secondary battery (see FIG. 1), and may be a cylindrical secondary battery, or a laminated secondary battery. The electrode assembly may be a cylindrical electrode assembly formed by rolling a positive electrode and a negative electrode with a separator interposed therebetween. Alternatively, the electrode assembly may be formed by repeatedly stacking a positive electrode, a separator, a negative electrode, and a separator.

Hereinafter, the invention will be described in more detail, and a lithium ion secondary battery will be taken as an example of the non-aqueous electrolyte secondary battery of the invention. However, the invention is not limited to the example described below.

(A) Optimization of Ratio $\alpha/\beta$

Example 1

Production of Lithium Ion Secondary Battery

Manufacture of Positive Electrode

Powder (having a specific surface area of 2.5 $m^2/g$) of a composite oxide containing Li and three kinds of transition metal elements (Co, Ni, and Mn) was prepared as a positive-electrode active material. The positive-electrode active material, acetylene black (conductive agent), and PVDF (binder) were mixed together so as to have a mass ratio of 90:8:2, and the mixture was diluted with N-methylpyrrolidone (NMP) to obtain a positive-electrode mixture paste.

The positive-electrode mixture paste was applied to both surfaces of an Al foil (positive-electrode current collector having a thickness of 15 μm) such that one end portion of the Al foil in its width direction was exposed. The positive-electrode mixture paste was then dried, to form positive-electrode mixture layers on the respective surfaces of the Al foil, except the end portion of the Al foil in its width direction. The positive-electrode mixture layers and the Al foil were then rolled by a rolling machine, to obtain a positive electrode having a positive-electrode exposed portion at one end in its width direction.

Manufacture of Negative Electrode

A carbon material containing natural graphite as a main component was prepared as a negative-electrode active material. The negative-electrode active material, carboxymethyl cellulose (CMC) (thickener), and polyvinylidene fluoride (binder) were mixed together so as to have a mass ratio of 98:1:1, and the mixture was diluted with water to obtain a negative-electrode mixture paste.

The negative-electrode mixture paste was applied to both surfaces of a Cu foil (negative-electrode current collector having a thickness of 10 μm) such that one end portion of the Cu foil in its width direction was exposed. The negative-electrode mixture paste was then dried, to form negative-electrode mixture layers on the respective surfaces of the Cu foil, except the end portion of the Cu foil in its width direction. The negative-electrode mixture layers and the Cu foil were then rolled by a rolling machine, to obtain a negative electrode having a negative-electrode exposed portion at one end in its width direction.

Manufacture of Separator

A first separator layer made of PP (having a thickness of 20 μm and a porosity of 85%) and a second separator layer made of PP (having a thickness of 20 μm and a porosity of 30%) were prepared. The thickness and porosity of the first separator layer and the thickness and porosity of the second separator layer were measured by the methods described above. The first separator layer and the second separator layer are stacked to obtain a separator.

Manufacture and Insertion of Electrode Assembly

The separator was disposed between the positive-electrode mixture layer and the negative-electrode mixture layer such that the first separator layer faces the positive-electrode mixture layer and the second separator layer faces the negative-electrode mixture layer. In addition, the positive electrode, the negative electrode, and the separator are disposed such that the positive-electrode exposed portion and the negative-electrode exposed portion stick out from the separator in opposite directions.

A rolled shaft (not illustrated) was then provided in parallel to the width direction of the Al foil (corresponding to the width direction of the positive electrode) and the width direction of the Cu foil (corresponding to the width direction of the negative electrode). The positive electrode, the separator, and the negative electrode were rolled around the rolled shaft. A pressure of 4 kN/cm$^2$ was applied to the obtained cylindrical electrode assembly at ordinary temperature for two minutes, to obtain a flat electrode assembly.

Next, a battery case lid provided with a positive-electrode terminal and a negative-electrode terminal was prepared. The positive-electrode exposed portion was connected to the positive-electrode terminal, and the negative-electrode exposed portion was connected to the negative-electrode terminal. The electrode assembly to which the lid has been connected was inserted into the body of the battery case, and then the opening of the body was closed with the lid.

Preparation and Injection of Non-Aqueous Electrolyte

Ethylene carbonate (EC), dimethyl carbonate (DMC), and ethylmethyl carbonate (EMC) were mixed together so as to have a volume ratio of 30:40:30, to obtain a mixed solvent. LiPF$_6$ was added to the mixed solvent so as to have a concentration of 1.0 mol/L. The obtained non-aqueous electrolyte was injected into the battery case through a liquid injection hole of the lid, and then the pressure in the battery case was reduced. As a result, the positive-electrode mixture layers, the negative-electrode mixture layers, and the separator are impregnated with the non-aqueous electrolyte. The liquid injection hole was then closed. In this way, a lithium ion secondary battery of Example 1 was produced.

Evaluation

Amount of Increase in Temperature

The produced lithium ion secondary battery was charged with a current of 10 A at −10° C. until the battery voltage reached 4V. Then, the lithium ion secondary battery was continuously charged until the battery voltage is further increased from 4V (overcharge).

The charging of the lithium ion secondary battery was stopped upon a significant decrease in the current flowing between the positive electrode and the negative electrode. From immediately after the stop of the charging, the temperature of the battery case was measured by a thermocouple. The measurement of the temperature of the battery case was stopped after a decrease in the temperature of the battery case was confirmed. An amount of increase in the temperature was calculated by substituting the obtained data into Expression 3 indicated below. In Expression 3, "maximum temperature" means the maximum value of the temperature of the battery case (the same applies to the following description). The results are shown in Table 1. When the amount of increase in the temperature is 10° C. or less, a further increase in the temperature of the lithium ion secondary battery after a shutdown of the second separator layer is considered to be prevented.

Amount of increase in temperature=maximum temperature−temperature of battery case immediately after stop of charging.

TABLE 1

| | First separator layer | | Second separator layer | | | Amount of increase in | Difference |
|---|---|---|---|---|---|---|---|
| | Thickness (μm) | Porosity (%) | Thickness (μm) | Porosity (%) | α/β | temperature (° C.) | in maximum temperature |
| Comparative Example 1 | 20 | 95 | 20 | 30 | 3.17 | (2) | C1 |
| Comparative Example 2 | | 90 | | | 3.00 | (2) | C1 |
| Example 1 | | 85 | | | 2.83 | 2 | A1 |
| Example 2 | | 80 | | | 2.67 | 4 | A1 |
| Example 3 | | 75 | | | 2.50 | 5 | A1 |
| Example 4 | | 70 | | | 2.33 | 5 | A1 |
| Example 5 | | 65 | | | 2.17 | 6 | A1 |
| Example 6 | | 60 | | | 2.00 | 7 | A1 |
| Comparative Example 3 | | 55 | | | 1.83 | 14 | C1 |
| Comparative Example 4 | | 50 | | | 1.67 | 25 | C1 |
| Comparative Example 5 | 20 | 95 | 20 | 40 | 2.38 | (5) | C1 |
| Comparative Example 6 | | 90 | | | 2.25 | (5) | C1 |
| Example 7 | | 85 | | | 2.13 | 6 | A1 |
| Example 8 | | 80 | | | 2.00 | 7 | A1 |
| Comparative Example 7 | | 75 | | | 1.88 | 12 | C1 |
| Comparative | | 70 | | | 1.75 | 14 | C1 |

TABLE 1-continued

| | First separator layer | | Second separator layer | | α/β | Amount of increase in temperature (° C.) | Difference in maximum temperature |
|---|---|---|---|---|---|---|---|
| | Thickness (μm) | Porosity (%) | Thickness (μm) | Porosity (%) | | | |
| Example 8 | | | | | | | |
| Comparative Example 9 | | 65 | | | 1.63 | 20 | C1 |
| Comparative Example 10 | 20 | 95 | 20 | 50 | 1.90 | 14 | C1 |
| Comparative Example 11 | | 90 | | | 1.80 | 16 | C1 |
| Comparative Example 12 | | 85 | | | 1.70 | 20 | C1 |
| Comparative Example 13 | | 80 | | | 1.60 | 22 | C1 |
| Comparative Example 14 | | 75 | | | 1.50 | 26 | C1 |
| Comparative Example 15 | | 70 | | | 1.40 | 29 | C1 |
| Comparative Example 16 | | 65 | | | 1.30 | 31 | C1 |

In Examples, the thickness of the first separator layer and the thickness of the second separator layer are equal to each other. Thus, the ratio "α/β" in Table 1 and Table 2 shown later indicates the ratio of the porosity of the first separator layer to the porosity of the second separator layer. When the porosity of the first separator layer is less than 90%, Expression 2 is considered to be satisfied.

Difference in Maximum Temperature

A reference lithium ion secondary battery (including a first separator layer having a porosity of 50% and a second separator layer having a porosity of 50%) was produced according to the method of producing the lithium ion secondary battery of Example 1. The reference lithium ion secondary battery was evaluated according to the method of evaluating the lithium ion secondary battery of Example 1. A difference in the maximum temperature was calculated by Expression 4. The results are shown in Table 1.

Difference in maximum temperature=maximum temperature of lithium ion secondary battery of Example 1−maximum temperature of reference lithium ion secondary battery  (4)

In Table 1, "A1" indicates the case where the difference in maximum temperature (see Expression 4) was 10° C. or less, and "C1" indicates the case where the difference in maximum temperature (see Expression 4) was more than 10° C. When the difference in maximum temperature is 10° C. or less, an increase in the temperature is considered to be inhibited even when the lithium ion secondary battery is overcharged. When an increase in the temperature is 10° C. or less and the difference in maximum temperature is 10° C. or less, the lithium ion secondary battery is considered to have a higher level of safety.

Examples 2 to 8 and Comparative Examples 1 to 16

Lithium ion secondary batteries were produced according to the method described in Example 1, except that the porosity of the first separator layer or each of the porosity of the first separator layer and the porosity of the second separator layer differed from that in Example 1. The resultant lithium ion secondary batteries were evaluated according to the method described in Example 1. The results are shown in Table 1. In Table 1, the figures in parentheses "Amount of increase in temperature (° C.)" of Table 1 are expected values (Comparative Examples 1, 2, 5, and 6).

Evaluations

As shown in Table 1, in Examples 1 to 8, the amount of increase in temperature was 10° C. or less, and the difference in maximum temperature was 10° C. or less. In contrast to this, in Comparative Examples 1, 2, 5, and 6, the difference in maximum temperature exceeded 10° C. In Comparative Examples 3, 4, and 7 to 16, the amount of increase in temperature exceeded 10° C., and the difference in maximum temperature exceeded 10° C. The results demonstrate that a lithium ion secondary battery that satisfies Expression 1 and Expression 2 has a higher level of safety.

The results of Examples 1 to 6 demonstrate that the higher the ratio α/β is, the smaller the amount of increase in the temperature is. The results also demonstrate that, as long as Expression 1 and Expression 2 are satisfied, a higher ratio α/β is preferred from the viewpoint of preventing a further increase in the temperature of a lithium ion secondary battery after a shutdown of a second separator layer.

In Comparative Examples 1, 2, 5, and 6, the difference in maximum temperature exceeded 10° C. although the amount of increase in temperature was expected to be 10° C. or less. The reason for this may be as follows. In Comparative Examples 1, 2, 5, and 6, the porosity of the first separator layer was 90% or more, and thus the first separator layer was likely to be crushed. Thus, the performance of the first separator layer as a separator was not kept high. As a result, the safety of the lithium ion secondary battery was lowered.

(B) Optimization of Specific Surface Area of Positive-Electrode Active Material

Examples 9 to 12

Lithium ion secondary batteries were produced according to the method described in Example 3, except that the specific surface area of each positive-electrode active material differs from that in Example 3. The produced lithium ion secondary batteries were evaluated according to the method described in Example 1. The results are shown in Table 2.

TABLE 2

| | Separator | | | | | Positive electrode | | |
|---|---|---|---|---|---|---|---|---|
| | First separator layer | | Second separator layer | | | Specific surface area of | Amount of increase in | Difference |
| | Thickness (μm) | Porosity (%) | Thickness (μm) | Porosity (%) | α/β | positive-electrode active material | temperature (° C.) | in maximum temperature |
| Example 3 | 20 | 75 | 20 | 30 | 2.50 | 2.5 | 5 | A1 |
| Example 9 | | | | | | 2.6 | 8 | A1 |
| Example 10 | | | | | | 2.8 | 8 | A1 |
| Example 11 | | | | | | 3.0 | 9 | A1 |
| Example 12 | | | | | | 3.5 | 10 | A1 |

As shown in Table 2, the amount of increase in temperature in Example 3 was smaller than that in each of Examples 9 to 12. The results demonstrate that, as long as the specific surface area of a positive-electrode active material is 2.5 m²/g or less, a further increase in the temperature of a lithium ion secondary battery after a shutdown of a second separator layer is more reliably prevented than in the case where the specific surface area of a positive-electrode active material is more than 2.5 m²/g.

The inventor considered that these results were obtained by the following reasons. When the specific surface area of a positive-electrode active material is 2.5 m²/g or less, the area of contact between the positive-electrode active material and a non-aqueous electrolyte is smaller and the amount of heat generated by a reaction between the positive-electrode active material and the non-aqueous electrolyte is smaller than those in the case where the specific surface area of a positive-electrode active material exceeds 2.5 m²/g. The inventor measured the amount of heat generated by a reaction between a positive-electrode active material and a non-aqueous electrolyte by a differential scanning calorimetry (DSC) under the following conditions. The results are shown in Table 3.

Measurement Conditions

The measurement conditions were as follows:
Range of measurement temperatures: 100° C. to 250° C.
Sample for measurement: positive-electrode active material dispersed in non-aqueous electrolyte

TABLE 3

| Specific surface area of positive-electrode active material (m²/g) | Amount of heat generated at 100° C. to 250° C. (mW) |
|---|---|
| 2.5 | 30 |
| 3.0 | 110 |
| 3.5 | 120 |

As shown in Table 3, when the specific surface area of a positive-electrode active material was 2.5 m²/g, the amount of heat measured by DSC (the amount of heat generated at 100° C. to 250° C. in Table 3) was significantly smaller than that in the case where the specific surface area of a positive-electrode active material was 3.0 m²/g. In contrast to this, when the specific surface area of a positive-electrode active material was 3.5 m²/g, the amount of heat measured by DSC (the amount of heat generated at 100° C. to 250° C. in Table 3) was slightly larger than that in the case where the specific surface area of a positive-electrode active material was 3.0 m²/g. These results demonstrate that, when the specific surface area of a positive-electrode active material is 2.5 m²/g or less, the amount of heat generated by a reaction between the positive-electrode active material and a non-aqueous electrolyte is smaller than that in the case where the specific surface area of a positive-electrode active material is more than 2.5 m²/g.

The embodiment and Examples described in this specification are to be considered in all respects as illustrative and not restrictive.

What is claimed is:

1. A non-aqueous electrolyte secondary battery, comprising:
   a positive electrode;
   a negative electrode;
   a first separator layer provided between the positive electrode and the negative electrode, the first separator layer facing a first side of the positive electrode;
   a second separator layer provided between the positive electrode and the negative electrode, the second separator layer facing a first side of the negative electrode; and
   a non-aqueous electrolyte held in the first separator layer and the second separator layer,
   wherein the positive electrode is stacked on the first separator layer, the first separator layer is stacked on the second separator layer, and the second separator layer is stacked on the negative electrode,
   wherein the following expressions are satisfied:

$2 \leq \alpha/\beta \leq 2.85$, and $\alpha < 90\%$, where $\alpha$ represents a porosity of the first separator layer, and $\beta$ represents a porosity of the second separator layer,
   wherein each of the first separator layer and the second separator layer are configured to be shut down,
   wherein the first separator layer and the second separator layer have the same thickness, and
   wherein the first separator layer and the second separator layer are made of the same material, and
   wherein the first separator layer and the second separator layer are made of polyethylene or polypropylene.

2. The non-aqueous electrolyte secondary battery according to claim 1, wherein the positive electrode contains a positive-electrode active material having a specific surface area of 2.5 m²/g or less.

3. The non-aqueous electrolyte secondary battery according to claim 1, when the non-aqueous electrolyte secondary battery is overcharged, the second separator layer is configured to be shut down before the first separator layer is shut down.

4. The non-aqueous electrolyte secondary battery according to claim 1, further comprising a third separator layer facing a second side of the positive electrode that is opposite to the first side of the positive electrode; and
a fourth separator layer facing a second side of the negative electrode that is opposite to the first side of the negative electrode, and
wherein α represents a porosity of the third separator layer, and β represents a porosity of the fourth separator layer.

* * * * *